United States Patent
Takahoshi et al.

(10) Patent No.: US 12,313,868 B2
(45) Date of Patent: May 27, 2025

(54) OPTICAL FILTER

(71) Applicants: AGC Inc., Tokyo (JP); Optical Coatings Japan, Tokyo (JP)

(72) Inventors: Hideaki Takahoshi, Tokyo (JP); Kazuya Takemoto, Tokyo (JP); Keisuke Kawai, Tokyo (JP); Masaaki Miyake, Tokyo (JP)

(73) Assignees: AGC Inc., Tokyo (JP); Optical Coatings Japan, Tokyo (JP)

( * ) Notice: Subject to any disclaimer, the term of this patent is extended or adjusted under 35 U.S.C. 154(b) by 520 days.

(21) Appl. No.: 17/873,335

(22) Filed: Jul. 26, 2022

(65) Prior Publication Data

US 2023/0039431 A1 Feb. 9, 2023

(30) Foreign Application Priority Data

Jul. 30, 2021 (JP) .................. 2021-126183

(51) Int. Cl.
  *G02B 5/20* (2006.01)
  *G02B 5/28* (2006.01)
(52) U.S. Cl.
  CPC ............. *G02B 5/208* (2013.01); *G02B 5/281* (2013.01); *G02B 5/285* (2013.01)

(58) Field of Classification Search
  CPC ................................ G02B 5/208; G02B 5/285
  USPC ............................................................ 359/350
  See application file for complete search history.

(56) References Cited

U.S. PATENT DOCUMENTS

| 9,354,369 | B2 | 5/2016 | Hendrix et al. | |
| 2014/0014838 | A1* | 1/2014 | Hendrix | H04N 5/33 |
| | | | | 359/359 |
| 2021/0103078 | A1* | 4/2021 | Neuman | G02B 5/281 |

\* cited by examiner

*Primary Examiner* — Jerry L Brooks
(74) *Attorney, Agent, or Firm* — Oblon, McClelland, Maier & Neustadt, L.L.P.

(57) ABSTRACT

An optical filter, including: a substrate; and a dielectric multilayer film laid on or above at least one major surface of the substrate, the dielectric multilayer film including at least two different layers, where: the dielectric multilayer film includes four or more films having a spin density of $5.0 \times 10^{10}$/nm·cm$^2$ or larger, each of the four or more films has a minimum thickness of 1.5 nm to 5 nm, a maximum transmittance at an incident angle of 0° in a wavelength range of 400 nm to 680 nm is 6% or lower, a maximum reflectance at an incident angle of 5° in the wavelength range is 20% or lower, and an average transmittance at an incident angle of 0° in at least one wavelength range having a width of 40 nm included in a wavelength range of 800 nm to 1570 nm is 90% or higher.

16 Claims, 4 Drawing Sheets

OPTICAL FILTER

CROSS-REFERENCE TO RELATED APPLICATIONS

This application claims priority from Japanese Patent Application No. 2021-126183 filed on Jul. 30, 2021, the entire subject matter of which is incorporated herein by reference.

TECHNICAL FIELD

The present disclosure relates to an optical filter that interrupts visible light and transmits infrared light.

BACKGROUND ART

To increase the sensitivity of the sensor such as a light detection and ranging (LiDAR) sensor, an optical filter that transmits near infrared light of 800 nm or longer and interrupts visible light causing external disturbance is used as a cover of a remote sensor module using near infrared light. In the case of a cover of a vehicular sensor, the optical filter preferably has a low transmittance of light in a visible range of 400 nm to 680 nm from the viewpoints of making the inside of the sensor less visible and making the external appearance of the cover look black to obtain high design performance.

Among optical filters, reflection optical filters are known in which dielectric thin films having different refractive indices are laid alternately (dielectric multilayer film) on one or both surfaces of a transparent substrate and which reflect light to interrupt utilizing light interference.

Absorption optical filters are also known which employ, as a multilayer film, a material that is optically absorptive.

For example, Patent document 1 discloses an optical filter having a dielectric multilayer film in which high refractive index layers and low refractive index layers are laid alternately. The high refractive index layers are silicon hydride layers whose extinction coefficient k in a wavelength range of 800 to 1,100 nm is smaller than 0.0005.

CITATION LIST

Patent Literature

U.S. Pat. No. 9,354,369

Technical Problems

However, in reflection optical filters that interrupt visible light by reflecting it, it is difficult to secure necessary design performance because the external surface(s) is a mirror surface.

In absorption-type optical filters, whereas they can reduce visible light transmissivity and visible light reflectivity by their visible light absorption property, it is difficult to maintain necessary near infrared transmissivity if only the visible light absorption property is enhanced because materials that absorb visible light also tend to absorb a near infrared range.

Furthermore, in sensors, it is necessary to secure transmissivity at large incident angles (large-angle incidence) in a near infrared range because a scan needs to be performed in a wide angular range.

Incidentally, it is inferred that in the optical filter disclosed in Patent document 1 the extinction coefficient in a wavelength range of 600 to 680 nm that includes a visible range is also small, that is, the transmittance in such a wavelength range is also high, because the extinction coefficient of the high refractive index layers in a wavelength range of 800 to 1,100 nm is small though it uses a visible light absorbable material. In addition, if the reflectance in the wavelength range of 600 to 680 nm is increased to compensate for the shielding property in such a wavelength range by the reflection ability of the multilayer film, the refection color becomes red to lower the design performance.

SUMMARY OF INVENTION

An object of the present invention is to provide an optical filter that exhibits high shieldability against visible light in a wavelength range of 400 to 680 nm and high transmissivity of near infrared light in a wavelength range of 800 nm or longer even at a large incident angle and that looks black.

The present inventors have studied the above problems and found out that the above problems can be solved by using a dielectric film material that exhibits high absorbability in a visible range and low absorbability in a near infrared range and controlling the thickness of such a dielectric film.

The present invention provides optical filters having the following configurations:

(1) An optical filter containing:
a substrate; and
a dielectric multilayer film laid on or above at least one major surface of the substrate as an outermost layer, in which:
the dielectric multilayer film is a laminate comprising a low refractive index film and a plurality of high refractive index films laid on each other;
the dielectric multilayer film comprises four or more high refractive index films that are 15 nm or smaller in thickness;
the high refractive index films have a minimum thickness of 1.5 to 5 nm;
the high refractive index films have a minimum thickness of 100 nm or smaller;
the high refractive index films satisfy the following spectral characteristics (i-1) and (i-2); and
the optical filter satisfies all of the following spectral characteristics (ii-1) to (ii-4):
(i-1) an extinction coefficient $k_{600}$ at a wavelength 600 nm is 0.12 or larger;
(i-2) a minimum extinction coefficient $k_{800\text{-}1570MIN}$ in a wavelength range of 800 to 1,570 nm is 0.01 or smaller;
(ii-1) a maximum transmittance $T_{400\text{-}680(0deg)MAX}$ at an incident angle of 0° in a wavelength range of 400 to 680 nm is 6% or lower;
(ii-2) a maximum reflectance $R_{400\text{-}680(0deg)MAX}$ at an incident angle of 5° in the wavelength range of 400 to 680 nm is 20% or lower;
(ii-3) an average transmittance $T_{X\text{-}Y(0deg)AVE}$ at an incident angle of 0° in a wavelength range of X to Y nm is 90% or higher, where X is in a range of 800 to 1,530 nm, Y is in a range of 840 to 1,570 nm, and Y−X=40 nm; and
(ii-4) an average transmittance $T_{X\text{-}Y(60deg)AVE}$ at an incident angle of 60° in the wavelength range of X to Y nm is 90% or higher, where X is in the range of 800 to 1,530 nm, Y is in the range of 840 to 1,570 nm, and Y−X=40 nm.

(2) An optical filter containing:

a substrate; and a dielectric multilayer film laid on or above at least one major surface of the substrate as an outermost layer, in which:

the dielectric multilayer film is a laminate comprising a low refractive index film and a plurality of high refractive index films laid on each other;

the dielectric multilayer film comprises four or more high refractive index films that are 15 nm or smaller in thickness;

the high refractive index films have a minimum thickness of 1.5 to 5 nm;

the high refractive index films have a minimum thickness of 100 nm or smaller;

the high refractive index films have a spin density of $5.0 \times 10^{10}/\text{nm·cm}^2$ or higher; and the optical filter satisfies all of the following spectral characteristics (ii-1) to (ii-4):

(ii-1) a maximum transmittance $T_{400\text{-}680(0deg)MAX}$ at an incident angle of 0° in a wavelength range of 400 to 680 nm is 6% or lower;

(ii-2) a maximum reflectance $R_{400\text{-}680(5deg)MAX}$ at an incident angle of 5° in the wavelength range of 400 to 680 nm is 20% or lower;

(ii-3) an average transmittance $T_{X\text{-}Y(0deg)AVE}$ at an incident angle of 0° in a wavelength range of X to Y nm is 90% or higher, where X is in a range of 800 to 1,530 nm, Y is in a range of 840 to 1,570 nm, and Y−X=40 nm; and (ii-4) an average transmittance $T_{X\text{-}Y(60deg)AVE}$ at an incident angle of 60° in the wavelength range of X to Y nm is 90% or higher, where X is in the range of 800 to 1,530 nm, Y is in the range of 840 to 1,570 nm, and Y−X=40 nm.

The invention can provide an optical filter that exhibits high shieldability against visible light in a wavelength range of 400 to 680 nm and high transmissivity of near infrared light in a wavelength range of 800 nm or longer even in a case of a large incident angle and that looks black.

DETAILED DESCRIPTION OF EMBODIMENT

Figure 1:
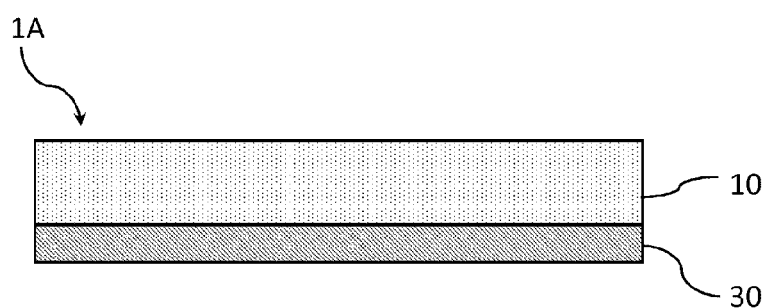
FIG. 1 is a schematic sectional view showing one example optical filter according to one embodiment.

In this specification, the expression the transmittance is 90% or higher, for example, in a particular wavelength range means that the transmittance is not lower than 90% in all of that wavelength range, that is, the lowest transmittance in that wavelength range is 90% or higher. Likewise, the expression "the transmittance is 1% or lower, for example, in a particular wavelength range" means that the transmittance is not higher than 1% in all of that wavelength range, that is, the highest transmittance in that wavelength range is 1% or lower. An average transmittance in a particular wavelength range is an arithmetic average of transmittance values at wavelengths spaced from each other by an interval 1 nm. The term "refractive index" means a refractive index for light having a wavelength 1,550 nm at 20° C. unless otherwise specified.

Spectral characteristics can be measured using a spectrophotometer. An extinction coefficient can be calculated by optical thin-film calculation software on the basis of measured values of a reflectance, a transmittance, and a thickness of a single-layer film formed on a quartz substrate. A visible reflectance is a luminous reflectance (Y value) in the CIE color system.

In this specification, the symbol "-" or the word "to" that is used to express a numerical range includes the upper limit and the lower limit of the range.

A spin density can be measured using an electron spin resonance instrument. Since spin densities that can be measured using the electron spin resonance instrument include spin densities associated with silicon dangling bonds, dangling bonds of a silica film, transition metal ions in a glass substrate, etc., proper working on a sample before a measurement and peak separation after a measurement are necessary.

In the working on a sample, substrate glass on which a multilayer film is formed should be removed as thoroughly as possible by polishing after cutting out an optical filter including the multilayer film into a proper size, whereby influence of a spin signal originating from the substrate glass can be minimized. The peak separation after a measurement can be performed by curve fitting, for example. A signal originating from silicon dangling bonds is observed as an isotropic signal in which g is 2.004 to 2.007 and the line width is 4 to 8 G, and these parameters are obtained as a result of peak separation by curve fitting using a linear combination function of line-width-equalized Gaussian function and Lorentz function. The term "line width" as used here means the difference between magnetic fields at a peak top and a peak bottom of an electron spin resonance spectrum that is obtained in differential form.

A spin density can also be calculated on the basis of an extinction coefficient because there is a correlation between the spin density and the extinction coefficient. For example, a spin density of amorphous silicon can be calculated using the approximation equation shown in FIG. 6 on the basis of an extinction coefficient $k_{600}$.

<Optical Filter>

An optical filter according to one embodiment of the invention (hereinafter may also be referred to as "present filter") is an optical filter that is equipped with a substrate and a dielectric multilayer film that is laid on at least one of the major surfaces of the substrate as an outermost layer.

Figure 2:
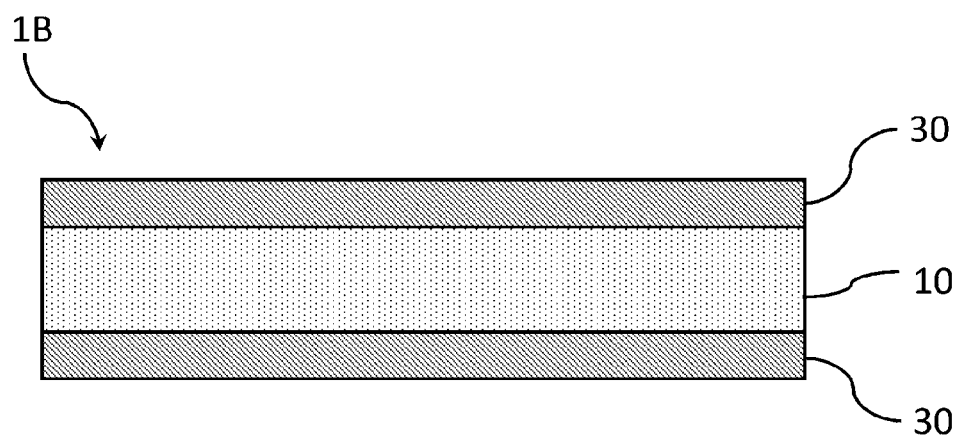
FIG. 2 is a schematic sectional view showing another example optical filter according to the embodiment.

Example configurations of the present filter will be described with reference to the drawings. FIGS. 1 and 2 are schematic sectional views showing example optical filters according to the embodiment.

An optical filter 1A shown in FIG. 1 is an example in which a dielectric multilayer film 30 is formed on or above one major surface of a substrate 10. The expression to have a particular layer "on or above a major surface of a substrate" is not limited to a case that the particular layer is in contact with the major surface of the substrate but includes a case that another function layer is provided between the substrate and the particular layer.

FIG. 2 shows another example in which an optical filter 1B has a dielectric multilayer film 30 on both major surfaces of the substrate 10.

When the optical filter according to the invention is installed, in the case of an optical filter having a dielectric multilayer film only on one surface, it is preferable that the side of the dielectric multilayer film be made the outside and the opposite side be made the sensor side. In the case of an optical filter having a dielectric multilayer film on both surfaces, it is preferable that the side of a dielectric multilayer film that meets a particular thickness and particular spectral characteristics as described later be made the outside and the opposite side be made the sensor side.

<Dielectric Multilayer Film(s)>

In the present filter, a dielectric multilayer film is laid as an outermost layer on at least one major surface of the substrate.

The dielectric multilayer film(s) is designed so as to have wavelength selectivity, and at least one dielectric multilayer film is a visible light absorption layer that interrupts visible light mainly by absorption and transmits near infrared light. In the case where a dielectric multilayer film is laid on both surfaces of the substrate, either both or only one of the dielectric multilayer films may be a visible light absorption layer. In the case where one of the dielectric multilayer films is a visible light absorption layer, the other dielectric multilayer film may be designed so as to function as a layer having another purpose such as an antireflection layer.

The dielectric multilayer film is a laminate comprising a low refractive index film and a plurality of high refractive index films laid on each other. Laying thin films having different refractive indices makes it possible to increase or decrease the reflectance utilizing the interference action of light. The transmittance decreases as the reflectance becomes larger. Low refractive index films and high refractive index films may be laid alternately.

The extinction coefficient or spin density of a multiplayer film varies depending on its material. The degree of light absorption becomes higher and the transmittance lowers as the extinction coefficient becomes larger. The degree of light absorption becomes higher as the spin density increases.

In the invention, an optical filter having target spectral characteristics is designed by taking the refractive index and the extinction coefficient or spin density of each multilayer film into consideration.

The spectral characteristics of the entire multilayer film vary depending on the thickness of each low refractive index film and the thickness of each high refractive index film. From the viewpoint of suppression of visible light reflectivity (increase of visible light absorbability), increasing the thickness of an absorptive dielectric film is advantageous. However, since in general a light absorption property is continuous, the ability to absorb not only visible light but also near infrared light may totally increase to lower the transmissivity in a near infrared range. In the invention, as described later, an optical filter is designed that satisfies both of suppression of visible light reflectivity and high transmissivity of near infrared light even at a large incident angle by controlling, in particular, the thickness of each high refractive index film which is also a visible light absorbable material.

In the invention, the high refractive index films satisfy the following spectral characteristics (i-1) and (i-2). Alternatively, in the invention, the spin density of the high refractive index films is $5.0 \times 10^{10}$/nm·cm$^2$ or larger.

(i-1) an extinction coefficient $k_{600}$ at a wavelength 600 nm is 0.12 or larger; and (i-2) a minimum extinction coefficient $k_{800-1570MIN}$ in a wavelength range of 800 to 1,570 nm is 0.01 or smaller.

The spectral characteristic (i-1) is a characteristic that prescribes absorbability of red light having a wavelength 600 nm. As for the spectral characteristic (i-1), since the extinction coefficient $k_{600}$ of the high refractive index films is 0.12 or larger, red light around 600 nm can be interrupted by absorption rather than reflection. It is therefore not necessary to increase the reflectance around 600 nm, as a result of which an optical filter can be obtained whose reflection color is not prone to be red. It is preferable that $k_{600}$ be 0.18 or larger and 1.00 or smaller.

Examples of a method for making $k_{600}$ of the high refractive index film to fall in the above range include using an amorphous silicon that is not doped with hydrogen, and using an amorphous silicon that is doped with hydrogen at 20 sccm or lower, as a high refractive index film material. The parameter $k_{600}$ can also be controlled by a multilayer film forming method.

The spectral characteristic (i-2) is a characteristic that prescribes absorbability of near infrared light in a wavelength range that is 800 nm or longer. As for the spectral characteristic (i-2), the minimum extinction coefficient $k_{800-1570MIN}$ in the wavelength range of 800 to 1,570 nm being 0.01 or smaller means that the absorbability of near infrared light is small in the wavelength range of 800 to 1,570 nm.

Examples of a method for making $k_{800-1570MIN}$ of the high refractive index film to fall in the above range include using an amorphous silicon that is not doped with hydrogen, and using an amorphous silicon that is doped with hydrogen at 20 sccm or lower, as a high refractive index film material. The parameter $k_{800-1570MIN}$ can also be controlled by a multilayer film forming method.

A dielectric multilayer film can be obtained whose visible light absorbability is high and near infrared light absorbability is low by using high refractive index films whose extinction coefficient $k_{600}$ and minimum extinction coefficient $k_{800-1570MIN}$ are in the above particular ranges.

The term "spin density" means an amount of dangling bonds in a film. In the invention, the above particular extinction coefficient $k_{600}$ can be obtained easily in the case where the spin density of the high refractive index films is $5.0 \times 10^{10}$/nm·cm$^2$ or higher. That is, a dielectric multilayer film that is high in visible light absorbability can be obtained. It is preferable that the spin density of the high refractive index films be $1.0 \times 10^{12}$/nm·cm$^2$ or higher.

Examples of a method for causing the spin density of the high refractive index film to fall in the above range include using an amorphous silicon that is not doped with hydrogen, and using an amorphous silicon that is doped with hydrogen at 20 sccm or lower, as a high refractive index film material.

It is preferable that the refractive index of the high refractive index films be 3.0 or higher, even preferably 4.0 or higher. Examples of a material of the high refractive index films include silicon (Si), Ge, ZnSe, $Ta_2O_5$, $TiO_2$, $Nb_2O_5$, and SiN. Among these examples, from the viewpoint of making the above particular extinction coefficient or spin density easier to realize, silicon is preferable and amorphous silicon is particularly preferable.

From the viewpoint of making $k_{600}$ 0.12 or larger or making the spin density $5.0 \times 10^{10}$/nm·cm$^2$ or higher, it is even preferable that the material of the high refractive index films be silicon that is not doped with hydrogen or silicon that is doped with a limited amount of hydrogen. Hydrogen doping can be performed by a known method. It is preferable that doping be performed at 20 sccm or lower, and non-doped silicon is particularly preferable.

It suffices that the low refractive index film be films having a lower refractive index than the high refractive index films. Examples of a material of the low refractive index film includes $SiO_2$, $SiO_xN_y$, $Ta_2O_5$, $TiO_2$, and SiO. Some of these materials which are lower in refractive index than the high refractive index films can be used in combination. In the case where the materials of the low refractive index film are used in combination, a low refractive index film having a relatively higher refractive index may be laid as a medium refractive index film and a low refractive index film having a relatively lower refractive index may be laid as the low refractive index film. It is preferable that the refractive index of the low refractive index film be 2.5 or lower, even preferably 1.5 or lower. $SiO_2$ is preferable from the viewpoint of productivity.

The dielectric multilayer film(s) employed in the invention includes four or more high refractive index films the thickness of each of which is 15 nm or smaller. The use of a particular number of high refractive index films each having a particular small thickness enables provision of an optical filter that is low in reflectivity in a visible range. Furthermore, it is preferable that the high refractive index films include one or more high refractive index films that are 5 nm or smaller in thickness. In the case where the optical filter according to the invention includes two or more dielectric multilayer films, it is preferable that at least one of them satisfies the above requirements.

The minimum thickness of the high refractive index films employed in the invention is 1.5 to 5 nm. Since the minimum thickness of the high refractive index films is in this range, an optical filter can be obtained that is high in the transmissivity in a near infrared range even at a large incident angle. It is preferable that the minimum thickness be 1.5 to 3.0 nm. In the case where the optical filter according to the invention includes two or more dielectric multilayer films (two or more groups of dielectric multilayer films), it is preferable that the high refractive index films of a dielectric multilayer film including four or more high refractive index films each of which is 15 nm or smaller in thickness satisfy the above requirements.

The maximum thickness of the high refractive index films employed in the invention is 100 nm or smaller. In the case where the maximum thickness of the high refractive index films is in this range, an optical filter can be obtained that is high in transmissivity in a near infrared range even at a large incident angle. It is preferable that the maximum film thickness be 90 nm or smaller. From the viewpoint of the transmission property in a near infrared range, it is preferable that the maximum film thickness be 30 nm or larger. In the case where the optical filter according to the invention is equipped with two or more dielectric multilayer films, it is preferable that the high refractive index films of a dielectric multilayer film including four or more high refractive index films each of which is 15 nm or smaller in thickness satisfy the above requirements.

In the case where the dielectric multilayer film(s) is designed as a visible light absorption layer, from the viewpoint of shieldability in a visible range, it is preferable that the total number of lamination layers of the dielectric multilayer film be 10 or larger, even preferably 20 or larger and further preferably 30 or larger. However, if the total number of lamination layers is too large, a warp or the like occurs or the film thickness becomes too large. It is therefore preferable that the total number of lamination layers be 70 or smaller, even preferably 60 or smaller and further preferably 50 or smaller.

Furthermore, from the viewpoint of productivity, it is preferable that the thickness of the dielectric multilayer film(s) be 1.5 µm or smaller, even preferably 1.0 µM or smaller. In the case where the number of dielectric multilayer films is two or larger, it is preferable that the total film thickness be 2.0 µm or smaller.

According to the invention, sufficient shielding can be attained in a visible range even if the number of lamination layers and the thickness of the dielectric multilayer film(s) are small. This is because the extinction coefficient, in a visible range, of the dielectric multilayer film(s) employed in the invention is large and hence it can attain shielding against visible light by absorption.

The dielectric multilayer film(s) can be formed by, for example, dry film formation processes such as CVD, sputtering, and vacuum evaporation and wet film formation processes such as a spray method and a dip method. Among these methods, dry film formation processes are preferable from the viewpoint that high refractive index films having controlled thin films as mentioned above can be obtained easily.

The prescribed spectral characteristics may be attained by either one or two or more dielectric multilayer films. In the case where two or more dielectric multilayer films are formed, they may have either the same or different structures. In the case where two dielectric multilayer films are provided, they may be such that one is a visible light absorption layer that transmits near infrared light and attain shielding against visible light and the other is a visible/near infrared light transmission layer that transmits both of visible light and near infrared light.

Also in the case where a dielectric multilayer film(s) is designed as an antireflection layer, dielectric films having different refractive indices are laid in the same manner as in the case of a visible light absorption layer(s). In addition, the antireflection layer may be made of an intermediate refractive index medium or a moth-eye structure in which the refractive index varies gradually instead of being a dielectric multilayer film.

<Substrate>

The substrate of the present filter may have either a single-layer structure or a plural-layer structure. The material of the substrate may be either an organic material or an inorganic material as long as it is a transparent material that transmits near infrared light. Furthermore, plural materials may be used in combination.

Preferable transparent inorganic materials include glass and a crystal material.

Example glass materials include soda-line glass, borosilicate glass, alkali-free glass, quarts glass, and aluminosilicate glass.

Another example glass material includes chemically strengthened glass obtained by replacing alkali metal ions existing adjacent to a major surface of a glass plate and having a small ion diameter (e.g., Li ions or Na ions) with alkali ions having a larger ion diameter (e.g., Na ions or K ions for Li ions or K ions for Na ions) at the temperature of the glass transition point or lower.

Example crystal materials include birefringent crystals such as quarts, lithium niobate, and sapphire.

There are no particular limitations on the shape of the substrate; it may have a block shape, a plate shape, or a film shape.

From the viewpoints of reduction in the degree of warp when the dielectric multilayer film is formed, height reduction of the optical filter, and suppression of braking, it is preferable that the thickness of the substrate be 0.1 to 5 mm, even preferably 2 to 4 mm.

<Characteristics of Optical Filter>

The optical filter according to the invention which is equipped with the substrate and the dielectric multilayer film(s) functions as an IR bandpass filter that interrupts visible light and transmits near infrared light.

The optical filter according to the invention satisfies all of the following spectral characteristics (ii-1) to (ii-4):
(ii-1) the maximum transmittance $T_{400\text{-}680(0deg)MAX}$ at an incident angle of 0° in a wavelength range of 400 to 680 nm is 6% or lower;
(ii-2) the maximum reflectance $R_{400\text{-}680(5deg)MAX}$ at an incident angle of 5° in the wavelength range of 400 to 680 nm is 20% or lower;
(ii-3) an average transmittance $T_{X\text{-}Y(0deg)AVE}$ at an incident angle of 0° in a wavelength range of X to Y nm is 90% or higher (X is in a range of 800 to 1,530 nm, Y is in a range of 840 to 1,570 nm, and Y−X=40 nm); and
(ii-4) an average transmittance $T_{X\text{-}Y(60deg)AVE}$ at an incident angle of 60° in a wavelength range of X to Y nm is 90% or higher (X is in the range of 800 to 1,530 nm, Y is in the range of 840 to 1,570 nm, and Y−X=40 nm).

The spectral characteristic (ii-1) means that the transmittance is low in the visible range of 400 to 680 nm, and the spectral characteristic (ii-2) means that the reflectance is low in the same visible range. In the case where the spectral characteristics (ii-1) and (ii-2) are satisfied, the transmission color and the refection color both become black, whereby an optical filter that is high in design performance can be obtained.

For example, the spectral characteristic (ii-1) can be attained by using high refractive index films whose extinction coefficient $k_{600}$ is the particular value or larger (spectral characteristic (i-1) mentioned above) or spin density is the particular value or higher, that is, high refractive index films that are high in absorbability in the visible range. The spectral characteristic (ii-2) can be attained by designing the dielectric multilayer film(s) so that it exhibits a desired visible light reflectance. Since the transmittance in the visible range is low as indicated by the spectral characteristic (ii-1), light in the visible range can be interrupted sufficiently even if the reflectance is not set high, as indicated by the spectral characteristic (ii-2).

It is preferable that the maximum transmittance $T_{400\text{-}680(0deg)MAX}$ be 5% or lower. It is preferable that the maximum reflectance $R_{400\text{-}680(0deg)MAX}$ be 10% or lower.

A reflectance relating to the characteristic (ii-2) is a value that is measured from the side of the dielectric multilayer film having high refractive index films that satisfy the above-mentioned spectral characteristics (i-1) and (i-2) or whose spin density is the particular value or higher.

The spectral characteristics (ii-3) and (ii-4) mean that an average transmittance is high in an arbitrary wavelength range having a width 40 nm in a near infrared range of 800 to 1,570 nm even at a large incident angle.

In the case where the spectral characteristics (ii-3) and (ii-4) are satisfied, when the optical filter is installed in a sensor, the sensitivity of the sensor can be kept high even when light shines on it at a large incident angle.

$T_{X\text{-}Y(0deg)AVE}$ being in the range of the spectral characteristic (ii-3) can be attained by, for example, forming a dielectric multilayer film using high refractive index films whose minimum extinction coefficient $k_{800\text{-}1570MIN}$ is the particular value or smaller (above-mentioned characteristic (i-2)), that is, whose absorbability in the near infrared range is low, and setting the design reflectance low in the wavelength range of X to Y nm.

$T_{X\text{-}Y(60deg)AVE}$ being in the range of the spectral characteristic (ii-4) can be attained by, for example, using a dielectric multilayer film in which the thicknesses of the above high refractive index films is controlled properly.

The optional wavelength range (X to Y nm) having the width 40 nm can be selected according to sensor sensitivity. When necessary, a dielectric multilayer film may be designed so that shielding can be attained by reflection in near infrared ranges other than X to Y nm.

It is preferable that the range of X to Y nm be 1,310 to 1,350 nm or 1,530 to 1,570 nm.

That is, it is preferable that the optical filter further satisfy both of the following spectral characteristics (ii-3A) and (ii-4A) or (ii-3B) and (ii-4B):
(ii-3A) an average transmittance $T_{1530\text{-}1570(0deg)AVE}$ at an incident angle of 0° in the wavelength range of 1,530 to 1,570 nm is 90% or higher; and
(ii-4A) an average transmittance $T_{1530\text{-}1570(60deg)AVE}$ at an incident angle of 60° in the wavelength range of 1,530 to 1,570 nm is 90% or higher; or
(ii-3B) an average transmittance $T_{1310\text{-}1350(0deg)AVE}$ at an incident angle of 0° in the wavelength range of 1,310 to 1,350 nm is 90% or higher; and
(ii-4B) an average transmittance $T_{1310\text{-}1350(60deg)AVE}$ at an incident angle of 60° in the wavelength range of 1,310 to 1,350 nm is 90% or higher.

The spectral characteristics (ii-3A) and (ii-4A) mean that the optical filter is high in transmissivity in the near infrared range of 1,530 to 1,570 nm even at a large incident angle.

The spectral characteristics (ii-3B) and (ii-4B) mean that the optical filter is high in transmissivity in the near infrared range of 1,310 to 1,350 nm even at a large incident angle.

In the case where the spectral characteristics (ii-3A) and (ii-4A) or (ii-3B) and (ii-4B) are satisfied, when the optical filter is installed in a sensor, the sensitivity of the sensor can be kept high even when light shines on it at a large incident angle.

It is even preferable that the average transmittance $T_{1530\text{-}1570(0deg)AVE}$ be 95% or higher.

It is even preferable that the average transmittance $T_{1530\text{-}1570(60deg)AVE}$ be 92% or higher.

It is even preferable that the average transmittance $T_{1310\text{-}1350(0deg)AVE}$ be 92% or higher.

It is even preferable that the average transmittance $T_{1310\text{-}1350(60deg)AVE}$ be 94% or higher.

Furthermore, it is preferable that the optical filter further satisfy the following spectral characteristic (ii-5):
(ii-5) the luminous reflectance Y is 5% or lower.

In the case where the spectral characteristic (ii-5) is satisfied, since the reflectance in a visible range is further low, the reflection color becomes black, whereby an optical filter that is high in design performance can be obtained.

It is preferable that the luminous reflectance Y be 4% or lower.

Still further, it is preferable that the optical filter according to the invention further satisfy the following spectral characteristics (ii-6) and (ii-7):
(ii-6) the reflection color a* is in a range of ±30; and
(ii-7) the reflection color b* is in a range of ±30.

In the case where the spectral characteristics (ii-6) and (ii-7) are satisfied, it is easier to obtain an optical filter whose reflection color is black and hence is high in design performance.

The color index L*a*b* that conforms to JIS Z 8781-4: 2013 is used.

It is even preferable that the reflection color a* be in a range of ±10. It is even preferable that the reflection color b* be in a range of ±10.

According to the above-described embodiment, an optical filter can be obtained that is high in the shieldability against visible light and the transmissivity of near infrared light and that looks black.

The invention has made it possible to lower the visible light reflectance by optical interference and secure a necessary transmittance of near infrared light by using a multilayer film material that is large in extinction coefficient $k_{600}$ (i.e., high in the absorbability in a visible range) and the minimum extinction coefficient $k_{800-1570MIN}$ is small (i.e., the absorbability in a near infrared range is low) or a multilayer film material having the particular spin density and controlling the thickness of such a multilayer dielectric film.

A LiDAR sensor according to the invention is equipped with the above-described optical filter according to the invention, whereby a sensor that is high sensitivity and superior in appearance can be obtained.

In other words, this specification discloses the following optical filter, etc.

(1) An optical filter comprising:
a substrate; and
a dielectric multilayer film laid on or above at least one major surface of the substrate as an outermost layer, in which:
the dielectric multilayer film is a laminate comprising a low refractive index film and a plurality of high refractive index films laid on each other;
the dielectric multilayer film comprises four or more high refractive index films that are 15 nm or smaller in thickness;
the high refractive index films have a minimum thickness of 1.5 to 5 nm;
the high refractive index films have a minimum thickness of 100 nm or smaller;
the high refractive index films satisfy the following spectral characteristics (i-1) and (i-2); and
the optical filter satisfies all of the following spectral characteristics (ii-1) to (ii-4):
(i-1) an extinction coefficient $k_{600}$ at a wavelength of 600 nm is 0.12 or larger;
(i-2) a minimum extinction coefficient $k_{800-1570MIN}$ in a wavelength range of 800 to 1,570 nm is 0.01 or smaller;
(ii-1) a maximum transmittance $T_{400-680(0deg)MAX}$ at an incident angle of 0° in a wavelength range of 400 to 680 nm is 6% or lower;
(ii-2) a maximum reflectance $R_{400-680(0deg)MAX}$ at an incident angle of 5° in the wavelength range of 400 to 680 nm is 20% or lower;
(ii-3) an average transmittance $T_{X-Y(0deg)AVE}$ at an incident angle of 0° in a wavelength range of X to Y nm is 90% or higher, where X is in a range of 800 to 1,530 nm, Y is in a range of 840 to 1,570 nm, and Y−X=40 nm; and
(ii-4) an average transmittance $T_{X-Y(60deg)AVE}$ at an incident angle of 60° in the wavelength range of X to Y nm is 90% or higher, where X is in the range of 800 to 1,530 nm, Y is in the range of 840 to 1,570 nm, and Y−X=40 nm.

(2) An optical filter comprising:
a substrate; and
a dielectric multilayer film laid on or above at least one major surface of the substrate as an outermost layer, in which:
the dielectric multilayer film is a laminate comprising a low refractive index film and a plurality of high refractive index films laid on each other;
the dielectric multilayer film comprises four or more high refractive index films that are 15 nm in thickness or smaller;
the high refractive index films have a minimum thickness of 1.5 to 5 nm;
the high refractive index films have a minimum thickness of 100 nm or smaller;
the high refractive index films have a spin density of $5.0 \times 10^{10}$/nm·cm$^2$ or higher; and
the optical filter satisfies all of the following spectral characteristics (ii-1) to (ii-4):
(ii-1) a maximum transmittance $T_{400-680(0deg)MAX}$ at an incident angle of 0° in a wavelength range of 400 to 680 nm is 6% or lower;
(ii-2) a maximum reflectance $R_{400-680(5deg)MAX}$ at an incident angle of 5° in the wavelength range of 400 to 680 nm is 20% or lower;
(ii-3) an average transmittance $T_{X-Y(0deg)AVE}$ at an incident angle of 0° in a wavelength range of X to Y nm is 90% or higher, where X is in a range of 800 to 1,530 nm, Y is in a range of 840 to 1,570 nm, and Y−X=40 nm; and
(ii-4) an average transmittance $T_{X-Y(60deg)AVE}$ at an incident angle of 60° in the wavelength range of X to Y nm is 90% or higher, where X is in the range of 800 to 1,530 nm, Y is in the range of 840 to 1,570 nm, and Y−X=40 nm.

(3) The optical filter according to (1) or (2), in which the optical filter further satisfies the following spectral characteristic (ii-5):
(ii-5) a luminous reflectance Y is 5% or lower.

(4) The optical filter according to any one of (1) to (3), in which the optical filter further satisfies the following spectral characteristics (ii-3A) and (ii-4A):
(ii-3A) an average transmittance $T_{1530-1570(0deg)AVE}$ at an incident angle of 0° in a wavelength range of 1,530 to 1,570 nm is 90% or higher; and
(ii-4A) an average transmittance $T_{1530-1570(60deg)AVE}$ at an incident angle of 60° in the wavelength range of 1,530 to 1,570 nm is 90% or higher.

(5) The optical filter according to any one of (1) to (4), in which the dielectric multilayer film has a total thickness of 2.0 μm or smaller.

(6) The optical filter according to any one of (1) to (5), in which the high refractive index films are silicon films and the low refractive index film is a silicon oxide film.

(7) The optical filter according to any one of (1) to (6), in which the high refractive index films are silicon films and have a spin density of $5.0 \times 10^{10}$/nm·cm$^2$ or larger.

(8) A LiDAR sensor containing the optical filter according to any one of (1) to (7).

EXAMPLES

Next, the invention will be described in more detail using Examples.

An extinction coefficient of a dielectric film was calculated by optical thin-film calculation software on the basis of measured values of a reflectance, a transmittance, and a thickness of a single-layer film formed on a quartz substrate.

Figure 6:
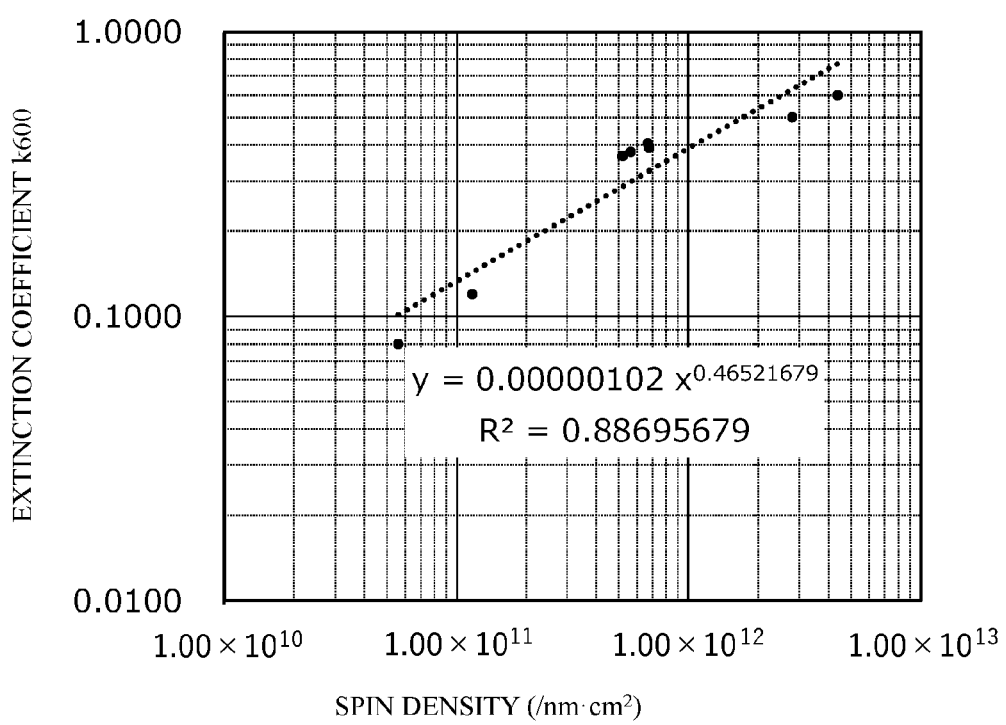
FIG. 6 is a graph showing a relationship between the spin density and the extinction coefficient $k_{600}$.

A spin density of a dielectric film was calculated using the approximation equation shown in FIG. 6 on the basis of an extinction coefficient. The approximation equation shown in FIG. 6 was calculated on the basis of extinction coefficients and spin densities of plural Si single-layer films that were formed on a quartz substrate and are different from each other in the hydrogen introduction amount and the amount of dangling bonds. An extinction coefficient of each Si single-layer film was calculated in the above-described method and a spin density of each Si single-layer film was measured using an electron spin resonance instrument "EMX-nano" produced by Bruker Corporation.

Spectral characteristics were measured using a spectrophotometer "Solid Spec-3700" produced by Shimadzu Corporation.

As for the spectral characteristics, when no particular incident angle is shown, measurement values are ones obtained at an incident angle of 0° (i.e., in a direction perpendicular to a major surface of an optical filter).

Chromaticity in a visible wavelength range was evaluated using "CM-26d" produced by Konica Minolta, Inc.

A borosilicate glass plate "Tempax" (registered trademark) produced by Schott that measured 100 mm (vertical)× 100 mm (horizontal)×3.3 mm (thickness) was used as a transparent glass substrate.

A dielectric multilayer film was formed using Si having a refractive index 3.5 (amorphous silicon that was not doped with hydrogen) and $SiO_2$ having a refractive index 1.47. An $SiO_2$ film was formed in an oxygen gas atmosphere using an Si target.

Example 1

A dielectric multilayer film (S1-1) of 23 layers having a thickness 1.8 μm was formed on one major surface of a transparent glass substrate by a DC magnetron sputtering method by laying Si films and $SiO_2$ films alternately in which each of the initial layer and the outermost layer was an $SiO_2$ film. The thinnest Si film (second layer from the outermost layer) had a thickness 2.1 nm and Si films whose thicknesses ware 15 nm or smaller were an Si film having a thickness 6.0 nm (fourth layer from the outermost layer), an Si film having a thickness 5.9 nm (eighth layer from the outermost layer), and an Si film having a thickness 9.4 nm (14th layer from the outermost layer). The thickest Si film had a thickness 89.3 nm (12th layer from the outermost layer).

Subsequently, a dielectric multilayer film (S2-1) of 11 layers having a thickness 1.1 μm was formed on the other major surface of the transparent glass substrate by the DC magnetron sputtering method by laying Si films and $SiO_2$ films alternately in which each of the initial layer and the outermost layer was an $SiO_2$ film. The thinnest Si film (10th layer from the outermost layer) had a thickness 8.8 nm and the thickest Si film (fourth layer from the outermost layer) had a thickness 35 nm.

An optical filter of Example 1 was obtained in the above manner.

Example 2

A dielectric multilayer film (S1-2) of 21 layers having a thickness 2.0 μm was formed on one major surface of a transparent glass substrate by the DC magnetron sputtering method by laying Si films and $SiO_2$ films alternately in which each of the initial layer and the outermost layer was an $SiO_2$ film. The thinnest Si film (second layer from the outermost layer) had a thickness 1.6 nm and Si films whose thicknesses ware 15 nm or smaller were an Si film having a thickness 5.8 nm (fourth layer from the outermost layer), an Si film having a thickness 11.2 nm (eighth layer from the outermost layer), and an Si film having a thickness 6.7 nm (14th layer from the outermost layer). The thickest Si film had a thickness 71.8 nm (12th layer from the outermost layer).

Subsequently, a dielectric multilayer film (S2-2) of 11 layers having a thickness 1.4 μm was formed on the other major surface of the transparent glass substrate by the DC magnetron sputtering method by laying Si films and $SiO_2$ films alternately in which each of the initial layer and the outermost layer was an $SiO_2$ film. The thinnest Si film (10th layer from the outermost layer) had a thickness 13.4 nm and the thickest Si film (fourth layer from the outermost layer) had a thickness 39.8 nm.

An optical filter of Example 2 was obtained in the above manner.

Example 3

A dielectric multilayer film (S1-3) of 21 layers having a thickness 1.7 μm was formed on one major surface of a transparent glass substrate by the DC magnetron sputtering method by laying Si films and $SiO_2$ films alternately in which each of the initial layer and the outermost layer was an $SiO_2$ film. The thinnest Si film (second layer from the outermost layer) had a thickness 0.9 nm and Si films whose thicknesses ware 15 nm or smaller were an Si film having a thickness 4.5 nm (fourth layer from the outermost layer) and an Si film having a thickness 9.8 nm (eighth layer from the outermost layer. The thickest Si film had a thickness 80.8 nm (12th layer from the outermost layer).

Subsequently, a dielectric multilayer film (S2-3) of 11 layers having a thickness 1.3 μm was formed on the other major surface of the transparent glass substrate by the DC magnetron sputtering method by laying Si films and $SiO_2$ films alternately in which each of the initial layer and the outermost layer was an $SiO_2$ film. The thinnest Si film (10th layer from the outermost layer) had a thickness 4.8 nm and the thickest Si film (fourth layer from the outermost layer) had a thickness 47 nm.

An optical filter of Example 3 was obtained in the above manner.

Example 4

A dielectric multilayer film (S1-4) of 23 layers having a thickness 1.9 μm was formed on one major surface of a transparent glass substrate by the DC magnetron sputtering method by laying Si films and $SiO_2$ films alternately in which each of the initial layer and the outermost layer was an $SiO_2$ film. The thinnest Si film (second layer from the outermost layer) had a thickness 2.1 nm and an Si film whose thickness was 15 nm or smaller was an Si film having a thickness 6.0 nm (fourth layer from the outermost layer). The thickest Si film had a thickness 89.3 nm (12th layer from the outermost layer).

Subsequently, a dielectric multilayer film (S2-4) of 11 layers having a thickness 1.3 μm was formed on the other major surface of the transparent glass substrate by the DC magnetron sputtering method by laying Si films and $SiO_2$ films alternately in which each of the initial layer and the outermost layer was an $SiO_2$ film. The thinnest Si film (10th layer from the outermost layer) had a thickness 4.8 nm and the thickest Si film (fourth layer from the outermost layer) had a thickness 47 nm.

An optical filter of Example 4 was obtained in the above manner.

Example 5

A dielectric multilayer film (51-5) of 14 layers having a thickness 1.0 μm was formed on one major surface of a transparent glass substrate by the DC magnetron sputtering method by laying Si films and SiO$_2$ films alternately in which each of the initial layer and the outermost layer was an SiO$_2$ film. The thinnest Si film (second layer from the outermost layer) had a thickness 5.2 nm and an Si film whose thickness was 15 nm or smaller was an Si film having a thickness 13.4 nm (fourth layer from the outermost layer). The thickest Si film had a thickness 266.7 nm (12th layer from the outermost layer).

Subsequently, a dielectric multilayer film (S2-5) of 14 layers having a thickness 0.7 μm was formed on the other major surface of the transparent glass substrate by the DC magnetron sputtering method by laying Si films and SiO$_2$ films alternately in which each of the initial layer and the outermost layer was an SiO$_2$ film. The thinnest Si film (13th layer from the outermost layer) had a thickness 4.3 nm and the thickest Si film (fourth layer from the outermost layer) had a thickness 152 nm.

An optical filter of Example 5 was obtained in the above manner.

Spectral characteristics of the optical filter of each of the above Examples and properties of its high refractive index films (Si films) are shown in the following table.

Figure 3:
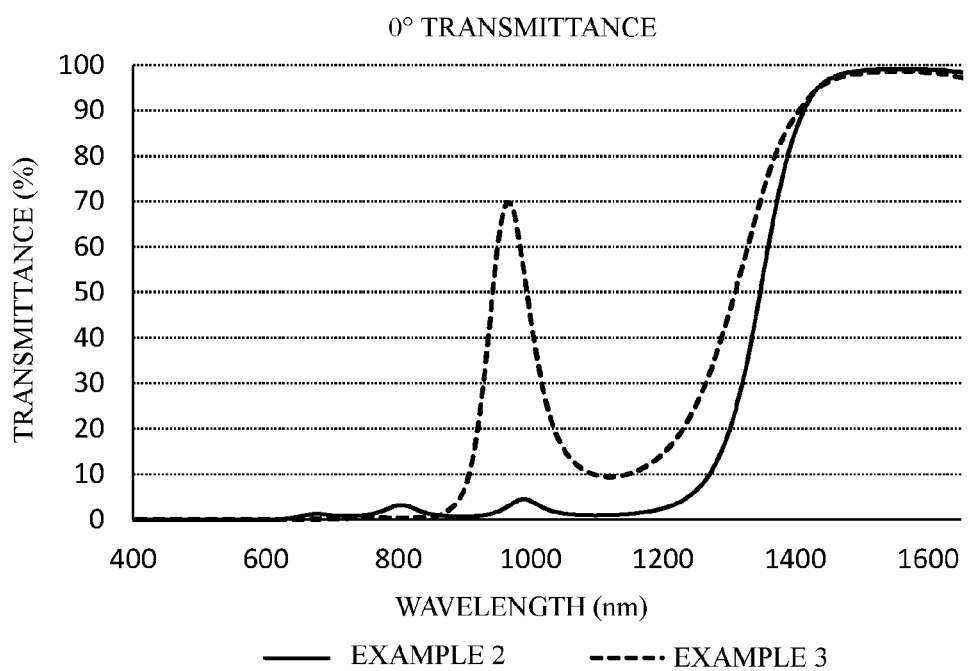
FIG. 3 is a graph showing spectral transmittance curves of optical filters of Examples 2 and 3 in a case that the incident angle was 0°.
Figure 4:
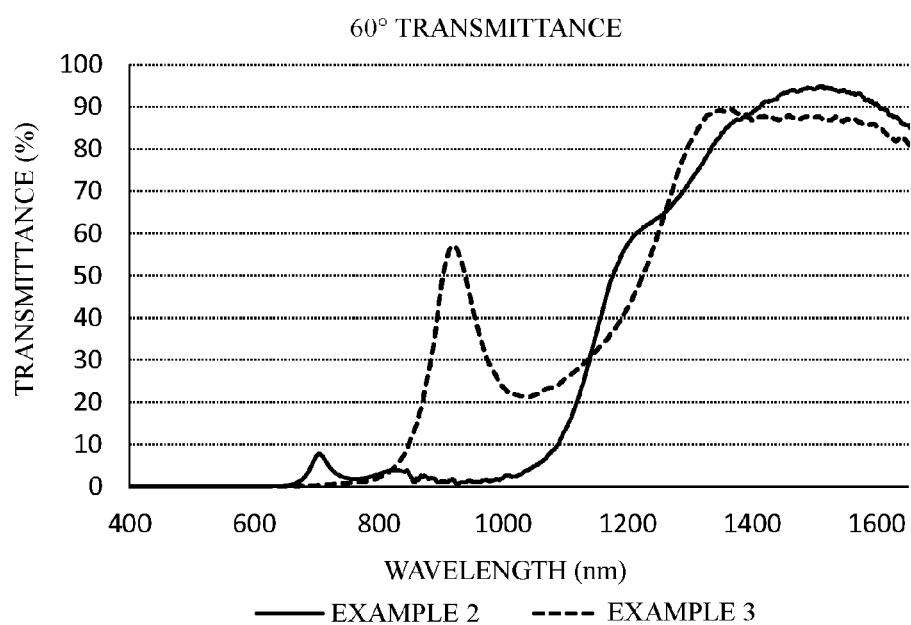
FIG. 4 is a graph showing spectral transmittance curves of the optical filters of Examples 2 and 3 in a case that the incident angle was 60°.
Figure 5:
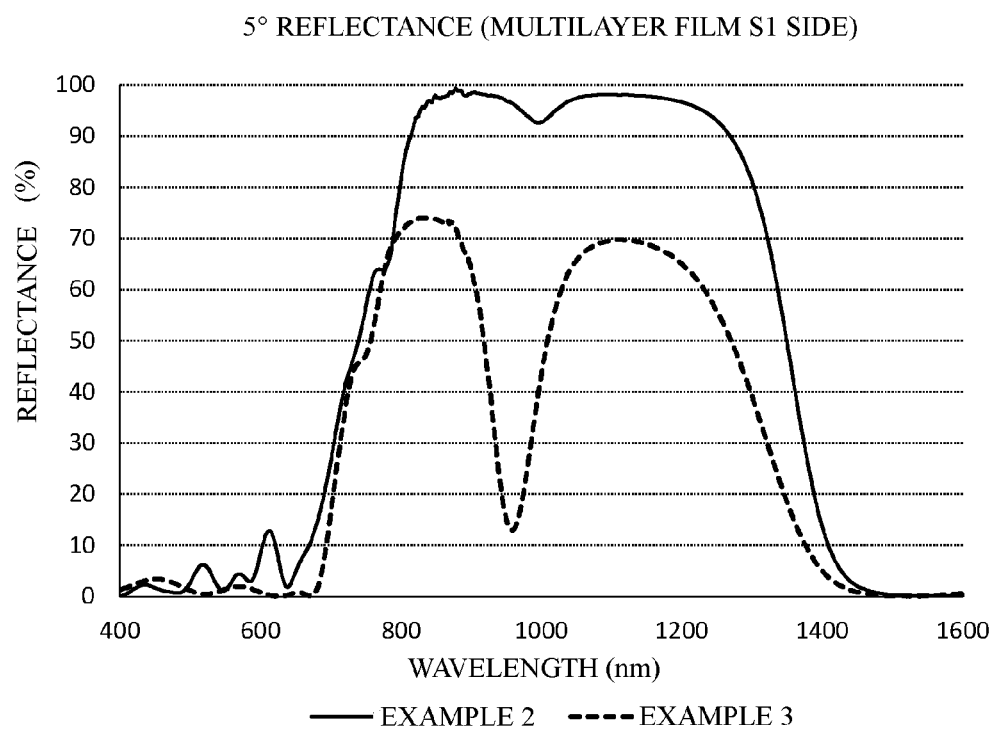
FIG. 5 is a graph showing spectral transmittance curves of the optical filters of Examples 2 and 3 in a case that the incident angle was 5°.

Spectral transmittance curves (incident angle: 0°), spectral transmittance curves (incident angle: 60°), and spectral reflectance curves (incident angle: 5°) of the optical filters of Examples 2 and 3 are shown in FIGS. 3, 4, and 5, respectively. Reflectance values were measured on the side of the dielectric multilayer film S1.

Examples 1 and 2 are Inventive Examples and Examples 3-5 are Comparative Examples.

TABLE 1

| | | | Ex. 1 | Ex. 2 | Ex. 3 | Ex. 4 | Ex. 5 |
|---|---|---|---|---|---|---|---|
| Dielectric multilayer film S1 | Low refractive index films (SiO$_2$) | Total thickness (μm) | 1.57 | 1.78 | 1.45 | 1.57 | 0.47 |
| | High refractive index films (Si) | Number of layers of 15 nm or smaller in thickness | 4 | 4 | 3 | 2 | 2 |
| | | Minimum thickness (nm) | 2.1 | 1.6 | 0.9 | 2.1 | 5.2 |
| | | Maximum thickness (nm) | 89.3 | 71.8 | 80.8 | 89.3 | 266.7 |
| | | Total thickness (nm) | 0.28 | 0.22 | 0.27 | 0.3 | 0.54 |
| | | Extinction coefficient $k_{600}$ | 0.29 | 0.29 | 0.29 | 0.29 | 0.29 |
| | | $k_{800-1570MIN}$ | 0 | 0 | 0 | 0 | 0 |
| | | Spin density (nm · cm$^2$) | $5.36 \times 10^{11}$ | $5.36 \times 10^{11}$ | $5.36 \times 10^{11}$ | $5.36 \times 10^{11}$ | $5.36 \times 10^{11}$ |
| | Number of lamination layers | | 23 | 23 | 21 | 23 | 14 |
| Dielectric multilayer film S2 | Low refractive index films (SiO$_2$) | Total thickness (μm) | 1.29 | 1.31 | 1.16 | 1.16 | 0.45 |
| | High refractive index films (Si) | Minimum thickness (nm) | 8.8 | 13.4 | 4.8 | 4.8 | 4.3 |
| | | Maximum thickness (nm) | 35 | 39.8 | 47 | 47 | 152 |
| | | Total thickness (nm) | 0.1 | 0.14 | 0.14 | 0.14 | 0.25 |
| | Number of lamination layers | | 11 | 11 | 11 | 11 | 14 |
| Spectral characteristics of optical filter | 5° average reflectance $R_{1530-1570(5\ deg)AVE}$ (%) | | 0.2 | 0.2 | 3.1 | 3.1 | 0.2 |
| | 0° average transmittance $T_{1530-1570(0\ deg)AVE}$ (%) | | 99.0 | 99.0 | 96.1 | 97.0 | 98.6 |
| | 60° average transmittance $T_{1530-1570(60\ deg)AVE}$ (%) | | 92.1 | 93.5 | 93.5 | 91.9 | 87.0 |
| | Maximum transmittance $T_{400-680(0\ deg)AVE}$ (%) | | 0.5 | 1.3 | 1.4 | 1.2 | 0.1 |
| | Maximum reflectance $R_{400-680(5\ deg)MAX}$ (%) | | 19.7 | 14.6 | 22.6 | 39.0 | 4.3 |
| | Average reflectance $R_{400-680(5\ deg)AVE}$ (%) | | 3.0 | 2.8 | 9.0 | 5.2 | 1.8 |
| | Luminous reflectance on the side of multilayer film S1 (%) | | 2.7 | 4.2 | 12.6 | 10.1 | 1.5 |
| | Brightness L* on the side of multilayer film S1 | | 17.1 | 24.4 | 41.9 | 39.2 | 12.7 |
| | Reflection color a* on1 the side of multilayer film S1 | | −0.5 | 9.4 | −4.4 | 36.6 | 7.3 |
| | Reflection color b* on the side of multilayer film S1 | | −4.5 | 20.7 | 30.9 | 28.1 | −16.4 |

It is understood from the above results that the optical filters of Examples 1 and 2 were high in the visible light shieldability and were high in the transmissivity of near infrared light in a wavelength range of 1,530 to 1,570 nm even at the large incident angle of 60°, and were low in visible light transmittance and reflectance and hence looked black.

In the optical filters of Examples 3 and 4 in which the number of high refractive index films being 15 nm or smaller in thickness was smaller than four, the reflectance in the visible range was high.

In the optical filter of Example 5 in which the number of high refractive index films being 15 nm or smaller in thickness was smaller than four, the minimum thickness of the high refractive index films was larger than 5 nm, and the maximum thickness of the high refractive index films was larger than 100 nm, the visible light transmittance at the incident angle of 60° was low.

INDUSTRIAL APPLICABILITY

Being high in near infrared light transmissivity and visible light shieldability, the optical filter according to the invention is useful when used for information acquisition devices such as cameras and sensors of transport machines, in particular, LiDAR sensors etc.

DESCRIPTION OF SYMBOLS 1A, 1B . . . Optical filter, 10 . . . Substrate, 30 . . . Dielectric multiplayer film

What is claimed is:

1. An optical filter, comprising:
a substrate; and
a dielectric multilayer film laid on or above at least one major surface of the substrate, the dielectric multilayer film comprising at least two different layers,
wherein:
the dielectric multilayer film comprises four or more films having a spin density of $5.0 \times 10^{10}$/nm·cm$^2$ or larger,
each of the four or more films has a minimum thickness of 1.5 nm to 5 nm,
a maximum transmittance at an incident angle of 0° in a wavelength range of 400 nm to 680 nm is 6% or lower,
a maximum reflectance at an incident angle of 5° in the wavelength range of 400 nm to 680 nm is 20% or lower,
an average transmittance at an incident angle of 0° in at least one wavelength range having a width of 40 nm included in a wavelength range of 800 nm to 1570 nm is 90% or higher, and
an average transmittance at an incident angle of 60° in at least one wavelength range having a width of 40 nm included in the wavelength range of 800 nm to 1570 nm is 90% or higher.

2. An optical filter, comprising:
a substrate; and
a dielectric multilayer film laid on or above at least one major surface of the substrate, the dielectric multilayer film comprising at least two different layers,
wherein:
the dielectric multilayer film comprises four or more films having an extinction coefficient $k_{600}$ at a wavelength of 600 nm of 0.12 or larger and a minimum extinction coefficient $k_{800-1570MIN}$ in a wavelength range of 800 nm to 1,570 nm of 0.01 or smaller,
each of the four or more films has a minimum thickness of 1.5 nm to 5 nm,
a maximum transmittance at an incident angle of 0° in a wavelength range of 400 nm to 680 nm is 6% or lower,
a maximum reflectance at an incident angle of 5° in the wavelength range of 400 nm to 680 nm is 20% or lower,
an average transmittance at an incident angle of 0° in at least one wavelength range having a width of 40 nm included in a wavelength range of 800 nm to 1570 nm is 90% or higher, and
an average transmittance at an incident angle of 60° in at least one wavelength range having a width of 40 nm included in the wavelength range of 800 nm to 1570 nm is 90% or higher.

3. The optical filter according to claim 1, further comprising:
four or more films having a spin density of $5.0 \times 10^{10}$/nm·cm$^2$ or larger and a thickness of 15 nm or smaller.

4. The optical filter according to claim 2, further comprising:
four or more films having an extinction coefficient $k_{600}$ at a wavelength of 600 nm of 0.12 or larger, a minimum extinction coefficient $k_{800-1570MIN}$ in a wavelength range of 800 nm to 1,570 nm of 0.01 or smaller, and a thickness of 15 nm or smaller.

5. The optical filter according to claim 1, wherein each of the four or more films has a maximum thickness of 100 nm or smaller.

6. The optical filter according to claim 2, wherein each of the four or more films has a maximum thickness of 100 nm or smaller.

7. The optical filter according to claim 1, having a luminous reflectance Y of 5% or lower.

8. The optical filter according to claim 2, having a luminous reflectance Y of 5% or lower.

9. The optical filter according to claim 1, wherein an average transmittance at an incident angle of 0° in a wavelength range of 1,530 nm to 1,570 nm is 90% or higher, and
an average transmittance at an incident angle of 60° in the wavelength range of 1,530 to 1,570 nm is 90% or higher.

10. The optical filter according to claim 2, wherein an average transmittance at an incident angle of 0° in a wavelength range of 1,530 nm to 1,570 nm is 90% or higher, and
an average transmittance at an incident angle of 60° in the wavelength range of 1,530 to 1,570 nm is 90% or higher.

11. The optical filter according to claim 1, wherein the dielectric multilayer film has a total thickness of 2.0 μm or smaller.

12. The optical filter according to claim 2, wherein the dielectric multilayer film has a total thickness of 2.0 μm or smaller.

13. The optical filter according to claim 1, wherein each of the four more more films is a silicon film.

14. The optical filter according to claim 2, wherein each of the four or more films is a silicon film.

15. A LiDAR sensor comprising the optical filter according to claim 1.

16. A LiDAR sensor comprising the optical filter according to claim 2.

* * * * *